Nov. 30, 1954   L. R. SEINFELD   2,695,565
DIAPHRAGM MECHANISM
Filed May 27, 1952   2 Sheets-Sheet 1
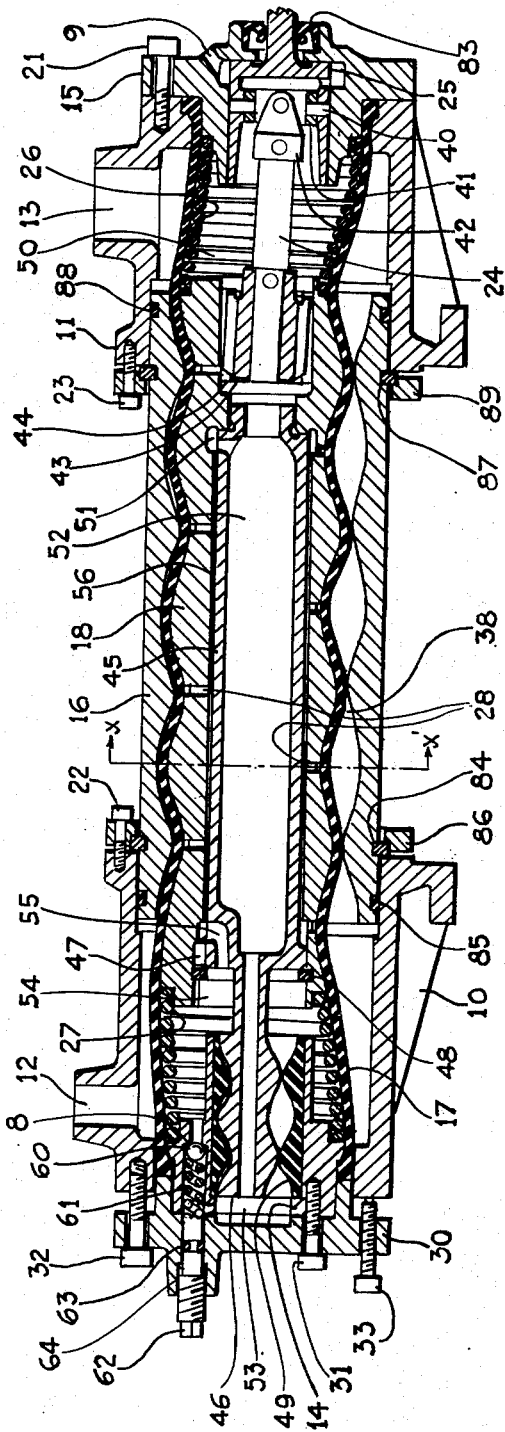
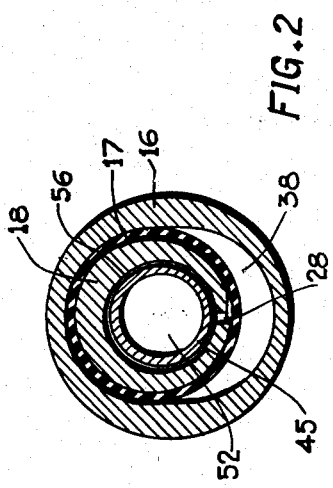
INVENTOR.
Ludwik R. Seinfeld
BY Nov. 30, 1954   L. R. SEINFELD   2,695,565
DIAPHRAGM MECHANISM
Filed May 27, 1952   2 Sheets-Sheet 2
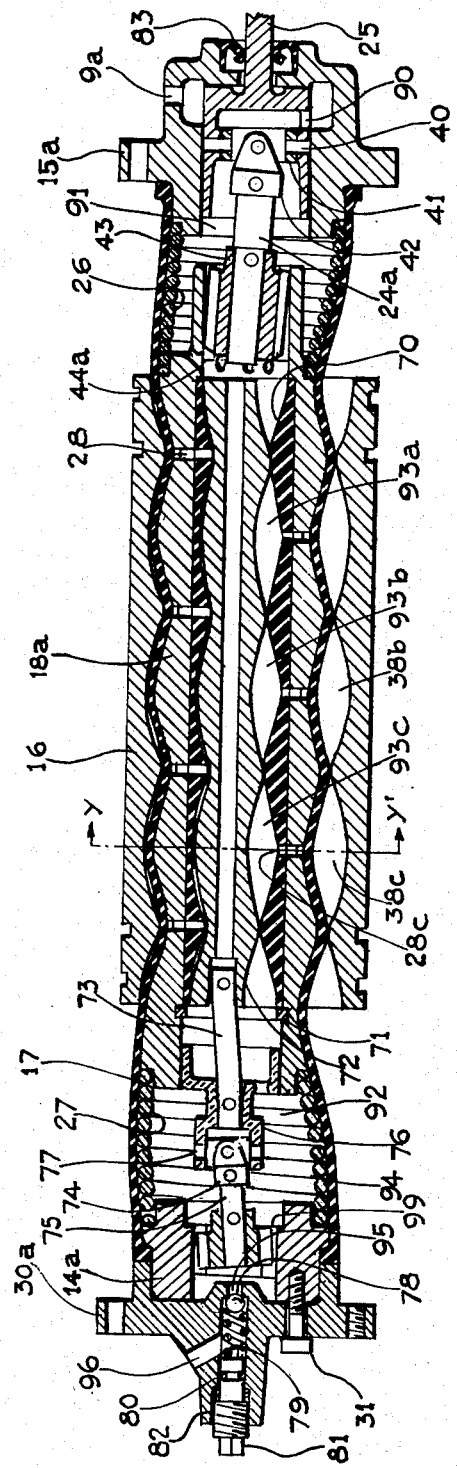
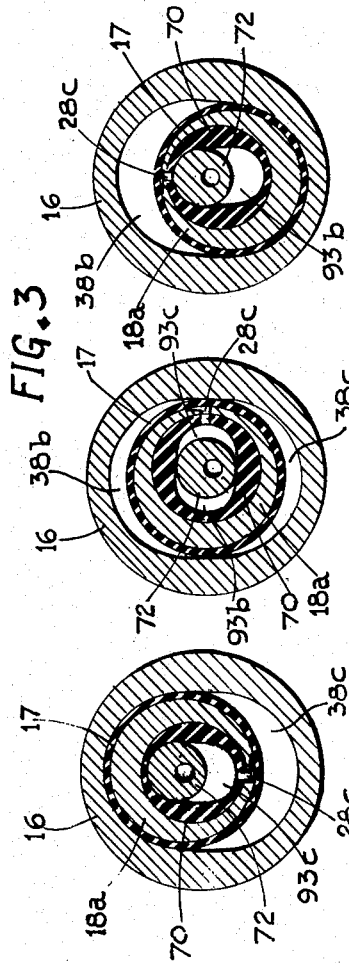
FIG. 3
FIG. 4
FIG. 5
FIG. 6
INVENTOR.
Ludwik R. Seinfeld
BY

United States Patent Office 2,695,565
Patented Nov. 30, 1954

2,695,565

DIAPHRAGM MECHANISM

Ludwik R. Seinfeld, Berkeley Heights, N. J.; Emmy Margaret Seinfeld, administratrix of said Ludwik R. Seinfeld, deceased, assignor to herself Application May 27, 1952, Serial No. 290,187

17 Claims. (Cl. 103—117)

The present invention relates to improvements in diaphragm mechanisms and chiefly in those tubular diaphragm mechanisms which are adapted to be used in high pressure fluid devices such as pumps, compressors and the like. This invention is characterized by the fact that means are provided within such a diaphragm to create fluid pressures inside the same, these inside pressures balancing approximately the fluid pressures prevailing outside the tubular diaphragm during normal operation of the mechanism.

This application is a continuation-in-part of my co-pending U. S. application Serial No. 254,775, filed November 3, 1951, and entitled "Diaphragm Mechanism."

The apparatus of the present invention is inherently reversible and may operate as a pump or motor, and therefore it is intended, within the scope of this invention to include both uses. For the sake of simplicity of description, the mechanism forming the subject matter of this invention will hereafter be described and claimed as a fluid driven or fluid conveying device to respectively cover its uses as a motor or pump.

One of the objects of the present invention is to provide means which, when applied to tubular diaphragm mechanisms, will reduce torsional stresses in said diaphragms.

Another object of the present invention is to reduce friction between the tubular diaphragm and the mechanism member actuating the same.

An additional object of the present invention is to provide, within the tubular diaphragms, means which assure approximate balance of fluid pressures on both sides thereof during normal operation of the diaphragm mechanism.

Still another object of the present invention is to achieve the aforementioned objects by means operated and at least partly enclosed by the member actuating the tubular diaphragm.

With the above objects in view the present invention mainly consists of apparatus members cooperating with the male helical member actuating the tubular diaphragm of the mechanism. In one form of construction the member cooperating with the male member is of cylindrical shape. This cylindrical member is arranged coaxially within the male member, the latter being provided with a cylindrical bore of a diameter slightly larger than the outside diameter of the cylindrical member to form a narrow cylindrical space between said members. This cylindrical space serves as a channel for a pressure equalizing fluid which is conveyed in a direction opposite to the flow of the fluid moving between the tubular diaphragm and the female mechanism member. This pressure equalizing fluid communicates by a plurality of perforations formed in the male member with the lubricating fluid film spread between the outside surface of the male member and the inside surface of the tubular diaphragm.

In another form of construction the member cooperating with the rotatable male mechanism member, actuating the diaphragm member, is itself a movable, but non-rotatable, male, helical member the axis of which follows a circular path relative to the axis of the rotatable male member. The latter is provided with internal, coaxial, female, helical threads, the number of said rotatable female threads exceeding the number of the threads of said non-rotatable male member by one thread. Each cross-section of the non-rotatable male helical member follows a reciprocating lateral movement relative to the axis of the rotatable female helical member, these two members cooperating in such a way that closed spaces are formed between spiral seal lines upon rotation of the male member actuating said diaphragm. These closed spaces wherein a pressure equalizing fluid is conveyed, communicate, by a plurality of perforations passing through the wall of said rotatable member, with the lubicating fluid film spread between the outside surface of the rotatable male member and the inside surface of the tubular diaphragm. The general direction of flow of the pressure equalizing fluid inside the tubular diaphragm is the same as the general direction of flow of the fluid moving outside said diaphragm due to the cooperation of said diaphragm with the stationary female mechanism member, upon rotation of the male member actuating said diaphragm.

The principles of the tubular diaphragm mechanism, as far as they concern the stationary female helical member, the tubular diaphragm and the rotatable male member actuating said diaphragm, have been disclosed in copending patent application Serial No. 254,775, filed November 3, 1951. No precedent exists, to my knowledge, for auxiliary members providing means for obtaining progressive fluid pressures inside the tubular diaphragm approximately equalling the progressive fluid pressures outside of the diaphragm during normal operation of the mechanism.

In a preferred form of construction the cylindrical member is hollow, is arranged coaxially within the male mechanism member actuating the diaphragm, is supported by and rotates with this male member. The cylindrical member carries a secondary hollow, male, helical member which cooperates with a secondary, stationary female helical member, arranged coaxially with the stationary supporting means. Both said auxiliary helical members are of the type described in U. S. Patent No. 1,892,217. These secondary helical members circulate, upon rotation of said diaphragm actuating member, a pressure equalizing fluid through the narrow cylindrical space formed between the cylindrical member and the cylindrical bore provided in the diaphragm actuating member and in such a way that the pressure drop along the total length of the cylindrical space equals approximately the pressure drop in the fluid moving between the diaphragm and the cooperating female member over an approximately equal length. If the pitches of the helical mechanism members cooperating with the diaphragm were non-constant, the cylindrical member would have to be substituted by a hollow member having a circular cross-section and a contour resembling a polytropic curve.

In the other form of construction the non-rotatable male helical member, arranged within and cooperating with the rotatable female helical member mounted coaxially within the male, diaphragm actuating member, is also supported by said diaphragm actuating member but prevented from rotating by a pivoted shaft assembly or an assembly of a floating shaft and two universal joints. One end of the pivoted shaft is pivotally connected to a bracket and the other end is pivotally and coaxially connected to the non-rotatable male member. The bracket is prevented from rotating by a floating shaft, one universal joint and a gear coupling the stationary part of which is arranged coaxially with the stationary mechanism members. The axis of the bracket is always in alignment with the axis of said diaphragm actuating member, and the pivotal shaft is coaxially connected to the bracket. Upon rotation of the diaphragm actuating member, the rotatable female member and the non-rotatable male member will cooperate in such a way that a pressure equalizing fluid filling the closed spaces formed between these helical members will be conveyed in the same general direction as the fluid moving between the diaphragm and its surrounding female member, thus permitting maintenance of approximately equal fluid pressures on both sides of said diaphragm over its whole length.

Having thus declared the objects and some of the features of the present invention, further advantages of this invention, as well as the actual working of the mechanism will be set forth more in detail in the following description.

In the accompanying drawings, which are given solely by way of example:

Fig. 1 is a longitudinal section of an apparatus constructed in accordance with the present invention and provided with a multistage diaphragm mechanism as well as with a cylindrical member controlling the pressure drop of the pressure equalizing fluid circulated according to the invention;

Fig. 2 is a typical cross-section of the apparatus along the line x—x' of Fig. 1 in the direction of the arrows;

Fig. 3 is a longitudinal section of an assembly of mechanism members comprising rotatable female and non-rotatable male auxiliary mechanism members, according to the invention, said assembly being adapted for alternate insertion into apparatus shown in Fig. 1;

Fig. 4 is a typical cross-section of the assembly taken along the line y—y' of Fig. 3 in the direction of the arrows;

Fig. 5 is a typical cross-section of the assembly taken along the the line y—y' of Fig. 3 in the direction of the arrows and showing the parts after rotation of the diaphragm actuating member through 90° from the position shown in Fig. 4; and Fig. 6 is a typical cross-section of the assembly taken along the the line y—y' of Fig. 3 in the direction of the arrows and showing the parts after rotation of the diaphragm actuating member through 180° from the position shown in Fig. 4.

In the form of construction shown in Fig. 1 the apparatus comprises stationary casing members 10 and 11 provided with conduits 12 and 13, respectively, for the fluid moving through the apparatus. Members 10 and 11 are connected tightly to the stationary, female, double helically threaded gearing member 16 by means of flanges 86 and 89, snap rings 84 and 87 and bolts 22 and 23, respectively. The tightness of the joints is assured by O-rings 85 and 88. Bearing housing 15 is bolted to casing member 11 by bolts 21.

Tubular diaphragm 17, disposed within said member 16, envelopes closely, at the central part of its length, the rotatable, male single helically threaded gearing member 18, and on each side of member 18 flexible members 26 and 27 respectively preventing collapse of diaphragm 17 under external pressure. Members 26 and 27 are deflected back and forth transversely to the axis of the apparatus and at the same angularity as move the adjoining ends of member 18, respectively. The reciprocating lateral movements of diaphragm 17 as well as the amplitude of the lateral movement of its supporting members 26 and 27 decrease from full stroke at the ends of member 18 to zero movement at the ends where diaphragm 17 is clamped tightly between stationary casing members 11 and 15 on one side and 10 and 14 on the other side.

Member 14 is connected to end flange 30 by bolts 31 and positioned relatively to member 10 by means of bolts 32 and jack screws 33.

Rotatable shaft 25 is supported in bearing housing 15 and is in driving relationship with member 18 by means of universal joint members 40, 41 and 42, shaft 24 and gear coupling 43 which cooperates with gear coupling member 44 provided inside member 18.

Hollow cylindrical member 45 is supported coaxially within member 18 and positioned by snap ring 48. Rotation of member 45 with member 18 is enforced by key 47. The outside diameter of member 45 over a length equivalent to at least the sum of the pitches of the threads of member 18, less one, is slightly smaller than the bore provided in member 18 over the same length. The resulting cylindrical space 56 is connected to the inside of diaphragm 17 by a plurality of perforations 28 provided in member 18. Member 45 supports hollow, auxiliary male helical member 46 the center line of which is an extension of the center line of member 18. As is shown in Fig. 2, the perforations 28 have enlarged open ends adjacent diaphragm 17.

Member 46 cooperates with auxiliary female gear member 49 arranged coaxially within member 14. Member 14 is provided with safety control valve seat 8. Ball type pressure control valve 60 is pressed against valve seat 8 by spring 61, the pressure of the latter being controlled by piston 62 which can be positioned by means of threads 64 provided in member 30. Tightness between piston 62 and member 30 is assured by O-ring 63. Valve 8, 60 forms a by-pass for fluid in member 14, as explained below.

Tightness of the mechanism where shaft 25 enters member 15 is provided by oil seal 83. Conduit 9 in member 15 provides means to fill the space enclosed by diaphragm 17, member 15 and member 30 with the required amount of pressure equalizing fluid.

As is shown in Fig. 3 where supports 10 and 11 are not illustrated, members 15, 18, 14 and 30 are replaceable by members 15a, 18a, 14a, and 30a, respectively, to permit operation of the mechanism shown in Fig. 1 and described above with an alternative assembly of auxiliary members.

Member 18a is provided with a coaxial bore into which a secondary female member 70 is tightly inserted for rotation with member 18a. Said member 70 has preferably the same number of threads as member 16 and is positioned within member 18a by snap ring 71. Arranged within said member 70 is a secondary male helical gearing member 72 which has preferably the same number of threads as member 18a. Said member 72 is pivotally connected to shaft 73 which is in turn pivotally connected to bracket 76. Member 18a supports said bracket 76 with the center line of the latter forming an extension of the center line of member 18a, and the latter is turnable about bracket 76. Bracket 76 supports universal joint members 74 and 77 which, in cooperation with floating shaft 75 and gear coupling members 94 and 99, prevent rotation of bracket 76. Stationary member 99 is arranged coaxially within member 14a. Bracket 76 is formed with an aperture to permit fluid to flow therethrough. Ball type pressure control valve 78 is pressed against seat 95 by coil spring 79 the pressure of which is adjusted by piston 81 which can be set by means of threads 82 provided in member 30a. Tightness of said piston 81 is assured by O-ring 80 pressed against the bore in member 30a, and an outlet is provided at 96. Pressure equalizing fluid is supplied through opening 9a.

The operation of the mechanism shown in Fig. 1 is as follows:

Rotatable shaft 25 is in driving relationship with helical member 18 by means of floating shaft 24 and coupling members 40, 41, 42 and 43, 44. Member 18 deforms diaphragm 17 in such a way that closed spaces are formed between continuous spiral seal lines established between helical member 16 and diaphragm 17. When member 18 is rotated, said spaces wherein the operating fluid is contained, are displaced spirally around the axis of the mechanism so as to communicate alternately with conduits 12 and 13 provided in casing members 10 and 11, respectively.

Hollow member 45 is rotated simultaneously with member 18 and actuates helical member 46 which cooperates with stationary member 49 in such a way that the pressure equalizing fluid filling the space enclosed by members 15, 17, and 30 is circulated from chamber 53 through members 46 and 49 into chamber 54 and on through channels 55 into the narrow cylindrical space 56 (see also Fig. 2) where its pressure drops gradually, to a pressure equivalent to the suction pressure of the mechanism, before returning to the cooperating members 46 and 49 through conduits 51, 52 and 53, conduit 52 being formed by the inner space of cylinder 45 and member 46.

The pressure created by members 46 and 49 is controlled by pressure control valve 60 arranged in a by-pass of member 14 and is preferably equal to the discharge pressure of the diaphragm mechanism. The progressive pressures prevailing in cylindrical space 56 are transmitted to the lubricating fluid spread between member 18 and diaphragm 17 by a plurality of perforations 28 provided in member 18 and having enlarged open ends adjacent diaphragm 17. As a result progressive pressures at the inner surface of diaphragm 17 are of substantially the same magnitude as the progressive pressures in the closed spaces 38 formed between the outside of the diaphragm 17 and the female mechanism member 16, one of these closed spaces 38 being transversely illustrated in Fig. 2.

The operation of the mechanism shown in Fig. 1 and fitted with an assembly of mechanism members as shown in Fig. 3 is as follows:

Rotatable shaft 25 is in driving relationship with helical member 18a by means of a floating shaft 24a and coupling members 40, 41, 42, 43 and 44a. Member 18a deforms diaphragm 17 in such a way that closed spaces 38a, 38b and 38c are formed between continuous spiral seal lines established between helical member 16 and diaphragm 17. Upon rotation of member 18a said spaces 38a, b, c, wherein the fluid is contained, are displaced spirally around the axis of the mechanism as shown in Figs. 4-6, so as to communicate alternately with conduits 12 and 13 provided in casing members 10 and 11, respectively (not shown in Fig. 3).

Secondary female helical member 70 rotates with helical member 18a and cooperates with non-rotatable male helical member 72 in such a way that closed spaces 93a, 93b and 93c, wherein a pressure equalizing fluid is contained, are formed between spiral seal lines. As is shown in Figs. 4-6, closed spaces 93a, b, c is displaced along the length of said non-rotatable male member 72 in the same general direction as is the fluid conveyed between diaphragm 17 and helical member 16. Both fluids are pressurized as they proceed from the low pressure chambers 13 and 91 to the high pressure chambers 12 and 92, respectively. A plurality of perforations 28c, penetrating the walls of both members 18a and 70 transmit the pressures prevailing in the closed spaces 93a, 93b and 93c to the inside surface of diaphragm 17, perforations 28c having enlarged open ends adjacent diaphragm 17. It is obvious that the pressures prevailing in the inside of the diaphragm 17 will approximately match the pressures prevailing at the outside of diaphragm 17, provided the viscosities of the fluids conveyed both sides of diaphragm 17 are practically the same. It is therefore also obvious that friction between diaphragm 17 and the diaphragm deforming member 18a is at a minimum.

With the friction reduced to less than the friction which would be present in a mechanism with one closed space only, that is, a mechanism not provided with auxiliary members as shown in Fig. 3 and described above, it is obvious that mechanisms with a plurality of closed spaces can be safely constructed without exerting undue torsional stresses on the diaphragm of the mechanism. Figs. 4-6 illustrate the movement of non-rotatable member 72 with respect to the other parts of the device.

It will be understood that each of the elements described above, or two or more together, may also find a useful application in other types of hydraulic apparatus differing from the types described above.

While the invention has been illustrated and described as embodied in hydraulic apparatus having a stationary flexible diaphragm mounted therein, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A fluid driven or fluid conveying device, comprising, in combination, stationary support means formed with inlet and outlet openings for fluid moving through the device and having a pair of chambers respectively communicating with said openings; an outer stationary elongated female member having an inner helically threaded surface and being fixedly mounted on said support means with the interior of said female member communicating at opposite ends respectively with said chambers; an elongated male member formed with an axial bore, having an outer helically threaded surface, and being located within said female member with the axis of said male member parallel to and spaced from the axis of said female member and with the outer surface of said male member spaced from the inner surface of said female member, said male member being formed with a plurality of apertures passing transversely through the same and communicating with said axial bore and said outer surface of said male member, and said male member being mounted on said support means for rotation with respect to said female member; an elongated, tubular, flexible diaphragm enveloping said male member and closely conforming to the shape of said outer surface thereof, said tubular diaphragm extending at opposite end portions thereof respectively through said chambers, and said tubular diaphragm being fixedly connected adjacent opposite ends thereof to said support means and having its outer and inner surfaces respectively contacting said inner surface of said female member and said outer surface of said male member along spiral sealing lines forming closed spaces, between said diaphragm and female member, which move along the length of the latter when said male member rotates and laterally reciprocates portions of said diaphragm so as to pump a fluid from said inlet opening to said outlet opening; and elongated pressure equalizing means located within said axial bore of said male member and communicating with said apertures thereof for controlling the flow of a pressure equalizing fluid through said axial bore and apertures of said male member to the inner surface of said diaphragm between the same and said outer surface of said male member, so that fluid pressures on opposite sides of said diaphragm are substantially equal at any one part of said diaphragm.

2. A device as defined in claim 1 and wherein said elongated pressure equalizing means is located in said axial bore of said male member with the axis of said pressure equalizing means extending in the direction of the axis of said male member.

3. A device as defined in claim 1 and wherein said tubular diaphragm extends at one end portion thereof beyond said male member to form at an end of said male member a compartment communicating with the pressure equalizing fluid between said diaphragm and outer surface of said male member, said pressure equalizing means being spaced from the inner surface of said male member and said compartment also communicating with the space between said pressure equalizing means and the inner surface of said male member so that the pressure equalizing fluid may flow in a circuit from said compartment, through the space between said pressure equalizing means and said inner surface of said bore of said male member, through said apertures in said male member, between said diaphragm and male member, and back to said compartment.

4. A device as defined in claim 3 and wherein a spring-pressed pressure control valve communicates with said compartment to maintain the fluid pressure therein below a predetermined upper limit.

5. A device as defined in claim 4 and wherein an adjusting means is operatively connected to said pressure control valve for adjusting said predetermined upper limit of the fluid pressure in said compartment.

6. A device as defined in claim 1 and wherein said axial bore of said male member is cylindrical and said pressure equalizing means is in the form of an elongated cylinder connected to said male member for rotation therewith and having an outer cylindrical surface spaced from the inner cylindrical surface of said axial bore to provide an annular space, between said pressure equalizing means and male member, communicating with said apertures in said male member.

7. A device as defined in claim 6 and wherein a secondary male member is connected to said elongated cylinder for rotation with the same and a secondary female member is fixedly mounted on said support means about said secondary male member, said male and female secondary members respectively having outer and inner helical surfaces cooperating with each other to pump a pressure equalizing fluid along the length thereof, the space between said secondary male and female members communicating with said annular space so that pressure equalizing fluid flows from said secondary male and female members to said annular space.

8. A device as defined in claim 7 and wherein said secondary male member is coaxial with said first-mentioned male member and said secondary female member is coaxial with said first-mentioned female member.

9. A device as defined in claim 7 and wherein said elongated cylinder is hollow and formed with a bore distant from said secondary male member and communicating with said annular space so that pressure equalizing fluid flows from said annular space to the interior of said elongated cylinder, said secondary male member being formed with an axial bore communicating with the interior of said hollow cylinder to receive pressure equalizing fluid therefrom.

10. A device as defined in claim 1 and wherein said axial bore of said male member has an inner helically threaded surface forming part of said pressure equalizing means, the latter including a secondary male member having an outer helically threaded surface cooperating with said inner surface of said axial bore.

11. A device as defined in claim 10 and wherein said secondary male member has the axis thereof parallel to and spaced from the axis of said first-mentioned male member, and wherein a connecting means interconnects said secondary male member with said support means to non-rotatably maintain said secondary male member in said axial bore for movement with respect to said first-mentioned male member.

12. A device as defined in claim 11 and wherein said connecting means comprises a bracket slidably engaging said first-mentioned male member; a shaft pivotally connected at one end to said secondary male member and at an opposite end to said bracket; and a universal joint located intermediate said support means and said bracket.

13. In a fluid driven or fluid conveying device, in combination, stationary support means; an elongated male member formed with an axial bore, having an outer helically threaded surface, being formed with a plurality of transversal apertures communicating with said bore and with the outer surface of said male member, and said male member being rotatably mounted on said support means; an elongated, tubular flexible diaphragm closely enveloping said male member and closely conforming to the shape of said outer surface thereof, said tubular diaphragm being fixedly connected adjacent opposite ends thereof to said support means; and elongated pressure equalizing means located within said axial bore of said male member and communicating with said apertures for controlling the flow of a pressure equalizing fluid through said axial bore and apertures of said male member to the inner surface of said diaphragm between the same and said outer surface of said male member.

14. In a device as defined in claim 13, said elongated pressure equalizing means being located in said axial bore of said male member with the axis of said pressure equalizing means extending in the direction of the axis of said male member.

15. In a device as defined in claim 13, said tubular diaphragm extending at one end portion thereof beyond said male member to form at an end of said male member a chamber communicating with the pressure equalizing fluid between said diaphragm and outer surface of said male member, said pressure equalizing means being spaced from the inner surface of said male member and said chamber also communicating with the space between said pressure equalizing means and the inner surface of said male member so that the pressure equalizing fluid may flow in a circuit from said chamber, through the space between said pressure equalizing means and said inner surface of said bore of said male member, through said apertures in said male member, between said diaphragm and male member, and back to said chamber.

16. In a device as defined in claim 15, a spring-pressed pressure control valve communicating with said chamber to maintain the fluid pressure therein below a predetermined upper limit.

17. In a device as defined in claim 16, an adjusting means operatively connected to said pressure control valve for adjusting said predetermined upper limit of the fluid pressure in said chamber.

References Cited in the file of this patent

UNITED STATES PATENTS

| Number | Name | Date |
| --- | --- | --- |
| Re. 21,374 | Moineau | Feb. 27, 1940 |
| 2,028,407 | Moineau | Jan. 21, 1936 |
| 2,188,702 | Burghauser | Jan. 30, 1940 |
| 2,512,764 | Byram | June 27, 1950 |
| 2,527,673 | Byram | Oct. 31, 1950 |
| 2,621,605 | Mark, Jr. | Dec. 16, 1952 |

FOREIGN PATENTS

| Number | Country | Date |
| --- | --- | --- |
| 637,586 | Germany | June 15, 1939 |